United States Patent [19] [11] 3,906,209
Bakka [45] Sept. 16, 1975

[54] WRONG ADDRESSING DETECTOR

[75] Inventor: Raymond Bakka, Boulogne, France

[73] Assignee: International Standard Electric Corporation, New York, N.Y.

[22] Filed: June 17, 1974

[21] Appl. No.: 480,079

[30] Foreign Application Priority Data

July 18, 1973 France ............................ 73.26286

[52] U.S. Cl. ........................................ 235/153 AM

[51] Int. Cl.² .................... G06F 11/00; G11C 29/00

[58] Field of Search .......... 235/153 AM; 340/172.5, 340/174 ED; 179/15 AT

[56] References Cited

UNITED STATES PATENTS

| | | | |
|---|---|---|---|
| 3,719,816 | 3/1973 | Darmon et al. ............ | 235/153 AM |
| 3,768,071 | 10/1973 | Knauft et al. ............... | 235/153 AM |

*Primary Examiner*—Charles E. Atkinson
*Attorney, Agent, or Firm*—John T. O'Halloran; Menotti J. Lombardi, Jr.; Alfred C. Hill

[57] ABSTRACT

A detector to detect two identical addresses during the same cycle in a TDM switching system has a one-bit location added to each different address word storing row of a control memory. Each address word sent by a cyclically operating addressing memory to a speech signal memory is also sent to the control memory and a logic 1 is written into the corresponding one-bit location. The logic 1 appears only at write time. At all other times a logic 0 appears in the one-bit location. This writing operation is preceded by a reading operation of the addressed row. Each row is read one time per cycle so that logic 1 is only read if there are two or more writing operations in the same row during a cycle.

5 Claims, 2 Drawing Figures

WRONG ADDRESSING DETECTOR

BACKGROUND OF THE INVENTION

The present invention relates to a device detecting the occurrence of identical binary words within time intervals, each having a duration equal to a predetermined cycle duration, the binary words being delivered from a circuit designed for recurrently and cyclically delivering a binary word at each elementary time of the predetermined cycle.

A high operation reliability is required from certain systems and, as a result, there is a need for testing the proper operation of circuits thereof in order to detect any failure as soon as possible and preferably as soon as it occurs so as to avoid operation troubles which may sometimes be important.

Addressing devices that are usually employed in program controlled systems are among these circuits. They recurrently and cyclically provide binary data words for selectively operating separate circuits.

Particularly it appears of interest in a certain number of cases to be able to detect the occurrence of several identical binary data words within the same control cycle. This particularly applies to ingoing and outgoing group addressing memories in a time-division switching system. These addressing memories store addresses of those speech memory rows wherein speech samples are temporarily stored. A speech memory row must normally be read out only once per cycle. Therefore, if the same binary data word occurs more than once during a time interval equal to a cycle duration from the addressing memory output, the result is a wrong switching for the speech sample stored in the addressed speech memory row, except in some particular cases.

SUMMARY OF THE INVENTION

Therefore, an object of this invention is to provide a device for detecting the occurrence of identical binary data words within time intervals, each of which have a duration equal to a predetermined cycle duration comprising N elementary times, such binary data words being delivered from a circuit designed for recurrently delivering at each elementary time a binary data word selected out of the N binary data words each of which comprise the same integer number of bits.

A feature of the present invention is the provision of a detection device for detecting the occurrence of identical binary words within given time intervals, each of the time intervals having a duration equal to the duration of a predetermined cycle duration comprising $n$ elementary times, where $n$ is an integer greater than one, comprising: a delivering circuit recurrently delivering at each elementary time a binary word selected out of $n$ binary words, each of the binary words including the same number of bits; storing means coupled to the delivery circuit for alloting an individual memory location to each of the $n$ binary words; first means coupled to the storing means capable of changing the condition of each of the memory locations into a first condition at one identical time interval for each of the cycles; second means coupled to the storing means capable of changing the condition of certain ones of the memory locations into a second condition, the certain one of the memory locations being those of the memory locations into which one of the binary words has been delivered by the delivery circuit; and detection means coupled to the storing circuit to determine the condition of the certain ones of the memory locations as soon as one of the binary words is delivered thereto and before the condition of the certain ones of the memory locations can be changed to the second condition and to provide an error signal when the certain ones of the memory locations has already changed to the second condition and an attempt is made to change the certain ones of the memory locations into the second condition again by an identical one of the binary words in less than the given time interval.

According to another feature of this invention the detection device comprises synchronizing means operating detecting means during a first portion of each elementary time; second condition positioning means during a second portion of each elementary time and cyclic positioning means during a third portion of each elementary time.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
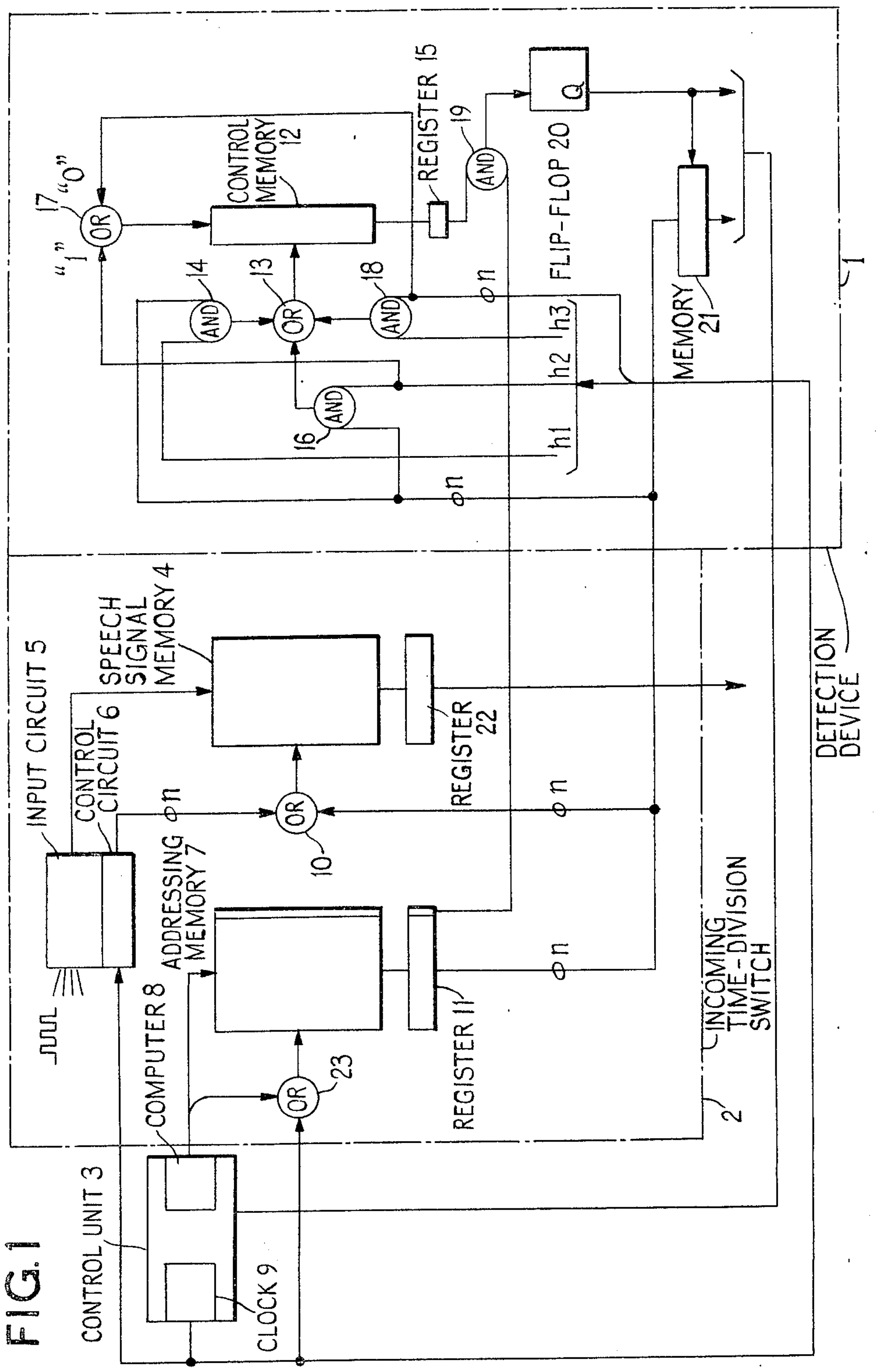
FIG. 1 is a block diagram of a detection device utilized to supervise a time-division group addressing memory according to the principles of this invention.

FIG. 1 shows, on the one hand, the detection device 1 according to this invention and, on the other hand, an incoming time-division switch 2 and the control unit 3 of a time-division switching network of which the time-division switch 2 is a part.

Incoming time-division switch 2 conventionally and basically includes a speech signal memory 4 connected to the output of input circuit 5 which receives signals from incoming time-division junctions (not shown). Memory 4 is in a write mode when addressed by a control circuit 6 associated with circuit 5 and in a read mode when addressed by an addressing memory 7 which is the delivering circuit referred to herein. Addressing memory 7 comprises a number of memory rows equal to the number of memory rows provided in speech signal memory 4, each row having a number of locations sufficient to make it possible to address any row of memory 4.

If speech memory 4 has $n$ rows which are sequentially and cyclically read out one by one within a time interval including $n$ elementary times, memory 7 must be capable to deliver $n$ addresses per cycle of $n$ elementary times to address memory 4 in a read mode. Computer 8 can provide memory 7 with binary data combinations or words which are the row addresses of memory 4. Computer 8 also can address memory 7 in a write mode, that is it selects the row of memory 7 wherein a word must be stored and delivers that word.

Clock 9 controls cyclic read of the various rows of memory 7 and as a consequence the addressing of rows of speech signal memory 4. Thus, a binary word is delivered from output of memory 7 at each elementary time. Such a word is associated with a telephone call for the duration of this call. The word is written into memory 7 when the call is established and erased when the call is released. In addition, the word is delivered from output of memory 7 at an identical position during each cycle of *n* elementary times.

The occurrence of two identical binary words from output of memory 7 during the same cycle of *n* elementary times causes two readings of the same row in memory 4 and thus two readings of the same sample which is transmitted to two distinct outgoing channels. The resulting double connection is usually not normal in a telephone system wherein each call is established between only two points, save in some specific cases.

Figure 2:
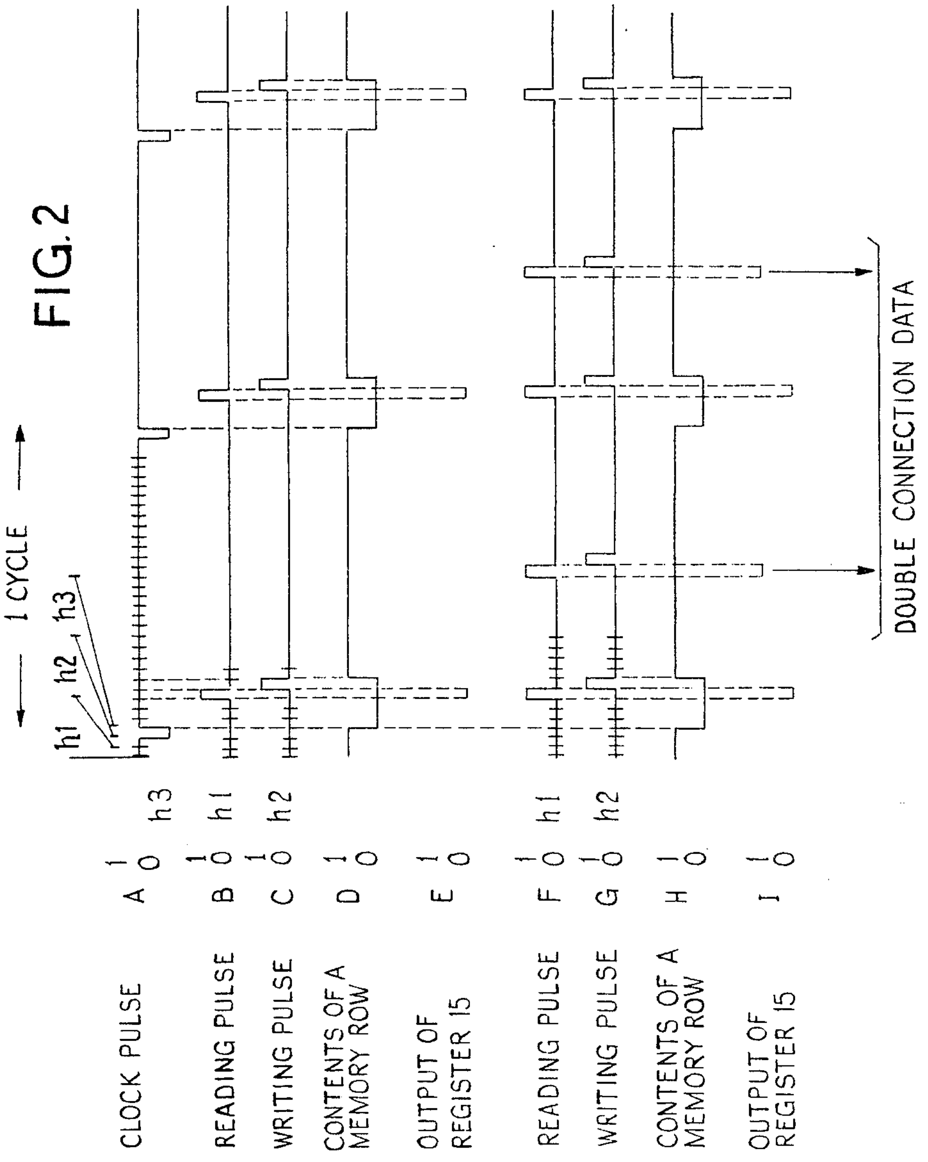
FIG. 2 is a timing diagram related to the operation of the detection device of FIG. 1.

Detection device 1 signals any occurrence of identical binary words within time intervals shorter than the duration of a cycle of *n* elementary times. For that purpose output register 11 of addressing memory 7 is connected to addressing inputs of a control memory 12 via an OR circuit 13 in the same manner as memory 7 is connected to addressing inputs of memory 4 via OR circuit 10. Register 11 receives parallel bits from memory 7 and delivers them to addressing inputs of both memories 4 and 12. Therefore, rows having the same rank in memories 4 and 12 are addressed at the same time. As a result the addressed row is read out from memory 4 and the corresponding row is read out from memory 12. Read-out operations in memory 12 are performed during the first portion of each elementary time indicated by signal $h1$. Signal $h1$ and other elementary times are controlled by clock 9. For read-out purposes signal $h1$, Curve B, FIG. 2 is applied to AND circuit 14 together with parallel addressing bits delivered from register 11. Data stored in the addressed row of memory 12 is then transmitted to output register 15 of memory 12.

During the second portion of each elementary time, indicated by signal $h2$, Curve C, FIG. 2, binary detection data is written into the row of memory 12 which has just been read, such binary detection data being stored in the same location where the read data was stored. Such binary detection data is predetermined and has a logic value 1, for instance. For this purpose signal $h2$ is applied, on the one hand, to AND circuit 16 together with parallel addressing bits from register 11 and, on the other hand, to data input of memory 12 in the form of a signal of logic value 1 via OR gate 17.

During the third portion of each elementary time, indicated by signal $h3$, Curve A, FIG. 2, mark data, which is the binary complement of the detection data, is written into a row of memory 12, this row being different at each elementary time and identical for each cycle of N times. For this purpose signal $h3$ is applied to AND circuit 18 which also receives a specific addressing binary word from a counter of clock 9 and which delivers that address to OR gate 13 and mark data of value 0 to OR gate 17.

Read-out of any row of memory 12 results in the occurrence of 0 from register 15 when the last word written into that row is due to the combination of an address H and a signal $h3$. Read-out of any row of memory 12 results in the occurrence of 1 from register 15, Curves D and H, FIG. 2, when the last word written into that row is due to the simultaneous presence of the address of that row and a signal $h2$, Curve D, FIG. 2. Therefore, the value of the last data written into a row will be known. Considering in addition that writings into memory 12 due to addressing memory 7 and those due to clock 9 are cyclic and that their respective cycles are equal in duration, the result is that two successive writings into memory 12 due to addressing memory 7 are normally separated by a writing into memory 12 due to clock 9 and vice verša.

Therefore, since the read-out phase for memory 12 is preceding at the same elementary time as the writing of a value 1 into that row, the value 1 must normally never be read-out from memory 12, Curve E, FIG. 2, except when two or more addressings of the same row of memory 12 has been performed by memory 7, Curves F and G, FIG. 2, during a time interval no longer than $n$-1 elementary times, Curve I, FIG. 2.

Thus, if following the transmission of an address from memory 7, via register 11, detection data, that is logic level 1, is delivered from register 15, Curve I, FIG. 2, detection data is transmitted to flip-flop 20 where it is temporarily stored before transferring it to control unit 3.

In an alternative, a memory 21 connected to the output of register 11 makes it possible to store the address for which detection data has been produced, such an address being transmitted to computer 8 with the corresponding detection data.

In certain cases, there is a need for sending two identical words per cycle, for instance, to establish a wished double time-division connection in a telephone exchange, while being capable to detect any undesirable identical words. For this purpose computer 8 delivers connection data to memory 7 with every address, connection data being 0 for desired identical words. Rows in memory 7 and register 11 each have an additional location to store a 0 or a 1 from computer 8. The additional location of register 11 is connected to the second input of AND gate 19 connected to the output of register 15.

Thus, occurrence of wanted identical words is always signalled from the output of register 15, but gate 19 allows only signalling of undesired identical words when gate 19 has its two inputs activated (a 1 in the additional location of register 15).

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for detecting the occurrence of identical binary words within given time intervals, each of said time intervals having a duration equal to the duration of a predetermined cycle duration comprising *n* elementary times, where *n* is an integer greater than one, comprising:

a delivering circuit recurrently delivering at each elementary time a binary word selected out of *n* binary words, each of said binary words including the same number of bits;

storing means coupled to said delivery circuit for alloting an individual memory location to each of said *n* binary words;

first means coupled to said storing means capable of changing the condition of each of said memory locations into a first condition at one identical time interval for each of said cycles;

second means coupled to said storing means capable of changing the condition of certain ones of said memory locations into a second condition, said certain ones of said memory locations being those of said memory locations into which one of said binary words has been delivered by said delivery circuit; and detection means coupled to said storing circuit to determine the condition of said certain ones of said memory locations as soon as one of said binary words is delivered thereto and before the condition of said certain ones of said memory locations can be changed to said second condition and to provide an error signal when said certain ones of said memory locations have already changed to said second condition and an attempt is made to change said certain ones of said memory locations into said second condition again by an identical one of said binary words in less than said given time interval.

2. A device according to claim 1, further including synchronizing means to operate said detection means during a first portion of each of said elementary times, to operate said second means during a second portion of each of said elementary times and to operate said first means during a third portion of each of said elementary times.

3. A device according to claim 2, wherein said delivering circuit includes a synchronizing clock, a speech signal memory, and an addressing memory coupled to said clock and said speech signal memory, said addressing memory addressing various rows of said speech signal memory, said synchronizing clock, said speech signal memory and said addressing memory being included in a time-division switch; and said storing means includes a control memory having as many of said memory locations as said speech signal memory has memory rows and as many of said elementary times in said cycle as said speech signal memory, first control means connected from the output of said addressing memory to the input of said control memory so as to sequentially read said location corresponding to a delivered address during said first portion, and to write detection data into said addressed location during said second portion, second control means connected to said clock to write mark data once during each of said cycle for each of said locations during said third portion, and signalling means connected to the output of said control memory responsive to the occurrence of said detection data to produce said error signal indicating the occurrence of two identical binary words stored in said addressing memory and the establishment of a double time-division connection at said speech signal memory.

4. A device according to claim 3, further including an additional location in each row of said addressing memory;

third means coupled to said addressing memory for loading an additional control information into each of said additional locations; and fourth means coupled to said addressing memory and said control memory responsive to said additional control information to inhibit said error signal when a desired double connection is detected.

5. A device according to claim 4, further including an additional memory coupled to the output of said addressing memory and to the output of said control memory to store any of said binary words that causes said detection data to appear at the output of said control memory.

* * * * *